United States Patent [19]

Leszkiewicz

[11] 4,441,275
[45] Apr. 10, 1984

[54] SWIMMING SPOON LURE

[76] Inventor: Edmund E. Leszkiewicz, 420 W. Camp McDonald Rd., Prospect Heights, Ill. 60070

[21] Appl. No.: 164,032

[22] Filed: Jun. 30, 1980

Related U.S. Application Data

[63] Continuation of Ser. No. 947,341, Oct. 2, 1978, abandoned.

[51] Int. Cl.³ ............................................. A01K 85/00
[52] U.S. Cl. .................................... 43/42.06; 43/42.5
[58] Field of Search ................. 43/42.06, 42.34, 42.5, 43/42.51, 42.18, 42.52

[56] References Cited

U.S. PATENT DOCUMENTS

| | | | |
|---|---|---|---|
| D. 222,353 | 10/1971 | Mills | 43/42.5 |
| 1,558,249 | 10/1925 | De Zeng | 43/42.51 |
| 1,598,958 | 9/1926 | Crosby | 43/42.5 |
| 1,903,256 | 3/1933 | Catarau | 43/42.06 |
| 2,315,307 | 3/1943 | Wilson | 43/42.5 |
| 2,632,276 | 3/1953 | Hale | 43/42.06 |
| 2,736,124 | 2/1956 | Wittmann | 43/42.06 |
| 3,143,825 | 8/1964 | Borgstrom | 43/42.06 |
| 3,257,750 | 6/1966 | Shannon | 43/42.5 |

FOREIGN PATENT DOCUMENTS

| | | | |
|---|---|---|---|
| 958469 | 9/1949 | France | 43/42.5 |
| 108245 | 6/1943 | Sweden | 43/42.5 |
| 262197 | 9/1949 | Switzerland | 43/42.06 |

*Primary Examiner*—James G. Smith
*Assistant Examiner*—K. Bradford Adolphson
*Attorney, Agent, or Firm*—Basil E. Demeur; Robert E. Knechtel; Alan B. Samlan

[57] ABSTRACT

A fishing lure which is designed such that when attached to a fishing line, will emulate the random swimming motion of a swimming body, formed by an elongate lure body having a forward end and a trailing end, and having a substantially overall side to side arcuate configuration, the lure body being provided with a plurality of apertures disposed through the lure body, each of the apertures being provided with a flared scoop disposed along a portion of the circumferential periphery of the aperture, and each of the flared scoops facing in the general direction of the forward end of the lure body and being positioned askew with respect to each of the adjacent flared scoops such that none of the adjoining and adjacent flared scoops are in parallel alignment one with respect to the next.

3 Claims, 7 Drawing Figures

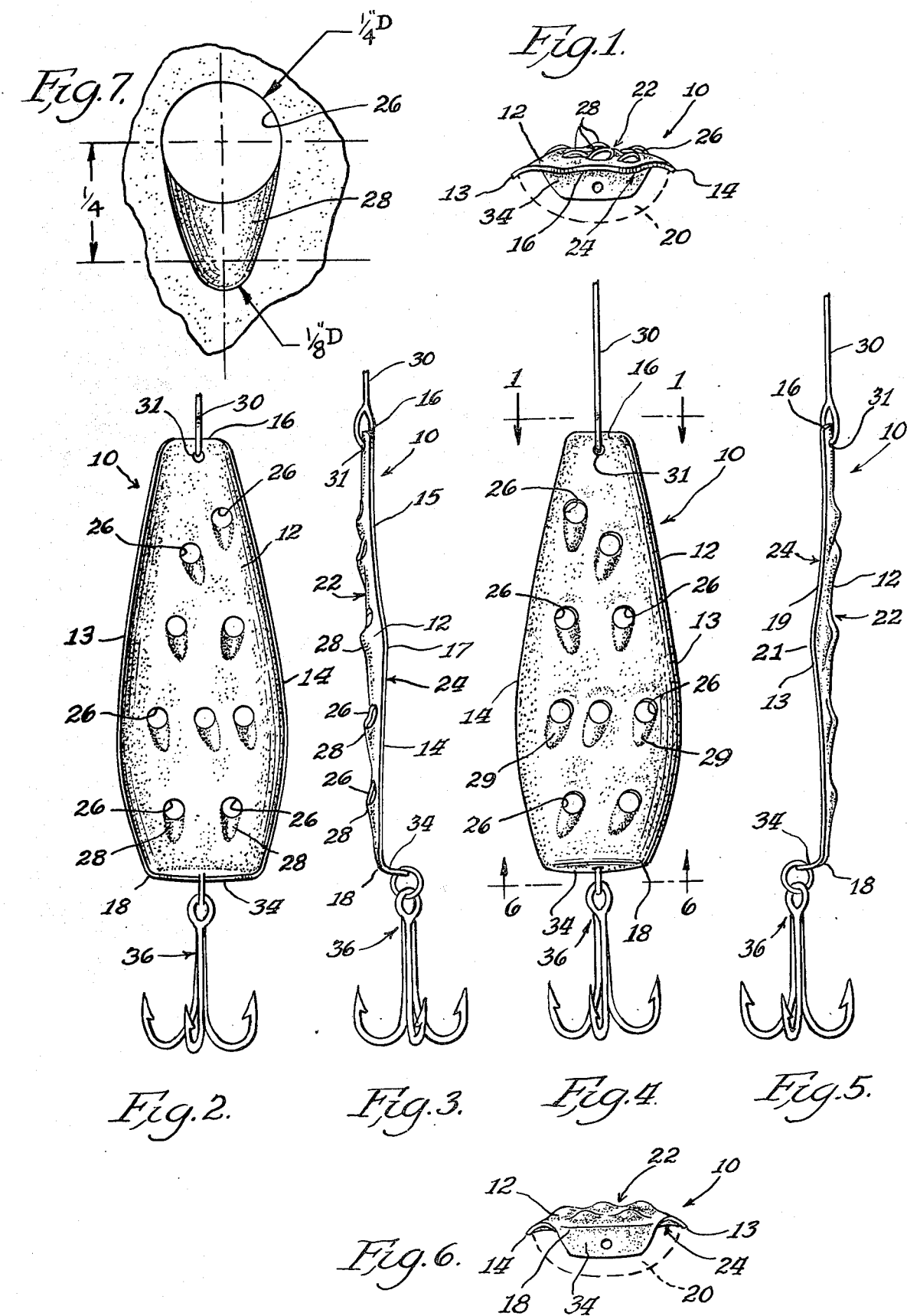

SWIMMING SPOON LURE

This is a continuation application of Ser. No. 947,341; filed Oct. 2, 1978, now abandoned.

BACKGROUND OF THE INVENTION

It is well known that there are presently commercially available any number of fishing lures which are used by both commercial as well as recreational fisherman for the purpose of engaging in the sport of fishing. The numbers of such lures vary tremendously depending on the type of fish to be caught, the location of fishing, and a number of other such factors. It is also well known that fishermen will regularly change and alter the types of lures that are used until a particular lure is found which serves the useful purpose of attracting the fish sought to be caught or snagged by the fishermen.

It is also well known that fish are generally attracted by either sound or motion, and only to some smaller extent by color or light. It has therefore been desirable in the past to attempt to develop lures which will achieve some degree of motion while traveling through the water as a source of attraction to the game fish sought to be caught. In this connection, a wide variety of different lures have been proposed and actually made available to the fishermen to achieve this desired function.

One means for achieving a degree of random motion by the lure in the water has been to provide the lure with apertures positioned in various portions of the fishing lure body. It has been theorized that the aperture will permit water to travel therethrough which has a bearing on the direction of travel of the lure. This in turn is considered to cause a degree of motion by the lure as it travels through the water as a source of attraction to the fish. It will therefore be noted that fishing lures such as the type shown in U.S. Pat. No. 3,143,825 shows a fishing lure wherein the lure body is provided with apertures on both side edges thereof, each of the apertures further including a protuberance which functions to achieve some degree of motion by the lure when it travels through the water. Similarly, U.S. Pat. No. 3,257,750 shows another form of a lure body which again is provided with apertures denoted by the numeral 24 which are positioned in the blade portions of the lure. These particular apertures or perforations are intended to provide sonic vibrations as the water rushes through the apertures with a view toward attracting fish in the vicinity.

Another form of a fishing lure provided with apertures is shown in U.S. Pat. No. 2,736,124, wherein it is shown that the lure is provided with a plurality of holes or apertures in a scoop portion, as well as on the top surface thereof which either facilitates either the motion of the lure through the water, or alternatively, creates sonic or sound vibrations to attract fish, or another alternative is to provide some sort of wobbling action as the lure travels through the water.

Again, as previously indicated, the numbers and varieties of lures which attempt to achieve some degree of wobbling motion or sonic noise in the water, are simply too numerous to describe in detail. It has been found, however, that none of such lures has been able to achieve what would appear to be a random swimming motion as the lure travels through the water which, as such, provides an improved lure. It has been found through experimentation that a fishing lure or spoon which achieves a motion which emulates the swimming motion of a body as it travels through the water is more likely to attract fish and therefore, the use of such lure has a greater degree of assurance to the fishermen using the same that fish in the vicinity will be attracted and caught.

OBJECTS AND ADVANTAGES

The object of the present invention is to provide an improved fishing lure which is constructed in a manner to achieve the emulation of random swimming motion as the lure travels through the water with a view toward a greater degree of attractiveness to fish in the vicinity.

In connection with the foregoing object, it is yet a further object of this invention to provide an improved fishing lure which is formed from an elongate lure body having a forward end and a trailing end, and having a substantially overall side to side arcuate configuration, and also provided with a plurality of apertures disposed through the lure body, each of the apertures being provided with a flared scoop disposed along a portion of the circumferential periphery of the aperture, and each of the flared scoops facing in the general direction of the forward end of the lure body and being positioned askew with respect to each of the adjacent flared scoops such that none of the adjoining and adjacent flared scoops are in parallel alignment one with respect to the next, such that when the fish lure travels through the water, a random swimming motion is achieved which functions to give the fisherman a greater assurance of attraction of fish in the vicinity of the subject fish lure.

In conjunction with the foregoing object, it is yet a further object to provide an improved fishing lure of the type described wherein the forward end of the fishing lure has a side to side dimension which is lesser than the side to side dimension of the trailing end of the fishing lure.

Still a further object of the invention is to provide an improved fishing lure of the type described wherein the flared scoop for each of the apertures measures a distance of less than one-half of the circumferential periphery of the corresponding aperture.

In conjunction with the foregoing objects, it is yet a further object of the invention to provide an improved fishing lure wherein the trailing end of the fish lure is provided with an up turned flange positioned at an approximate ninety degree angle relative to the lure body and extending laterally outwardly from the concave lower surface thereof in order to facilitate the swimming motion of the lure and to further provide a surface for attachment of the hook assembly at the trailing end of the lure.

Further features of the invention pertain to the particular arrangement of the parts and elements whereby the above outlined and additional operating features thereof are attained. The invention, both as to its method of operation and nature of construction will best be understood by referance to the accompanying drawings.

BRIEF DESCRIPTION OF THE DRAWINGS

With reference to the accompanying drawings:

FIG. 1 is a front elevational view of the improved lure of the present invention showing the body portion and the flared scoop portions thereof;

FIG. 2 is a side elevational view showing the convex surface thereof and the disposition of the apertures and the flared scoops associated therewith;

FIG. 3 is a side elevational view showing the arcuate configuration of the subject fishing lure and the manner in which the flared scoop portions are positioned along the convex surface of the lure;

FIG. 4 is a front elevational view showing the concave surface of the subject fishing lure and also showing the up turned flange portion which serves as a point of attachment of the hook assembly;

FIG. 5 is a side elevational view showing the opposing side edge of the subject fishing lure relative to FIG. 3 of the drawings;

FIG. 6 is an end elevational view taken in the direction of the arrows along the line 6-6 of FIG. 4 and showing the up turned flange portion of the fish lure body which serves a point of attachment for the hook assembly; and FIG. 7 is an enlarged view of a single aperture disposed in the fish lure body indicating relative dimensions between the aperture and the flared scoop portion thereof.

SUMMARY OF THE INVENTION

In summary, the invention provides an improved fish lure which is constructed in a manner to achieve a motion which emulates the random swimming motion of a body as it travels through the water. The motion is basically achieved by providing the lure with a side to side arcuate configuration, and providing the fish lure body with a plurality of apertures, each of the apertures further provided with a flared scoop portion along a portion of the circumferential periphery of the corresponding aperture, the flared scoop portion extending upwardly from the convex surface of the fish lure body. A further feature of the improved fish lure of the present invention relates to the orientation of the apertures and the flared scoop portions associated therewith such that each of the adjoining and adjacent flared scoop portions associated with an adjacent and adjoining aperture is positioned slightly askew one with respect to the next such that none of the adjoining apertures and associated flared scoop portions are in parallel alignment one with respect to the next. A further feature of the improved fish lure of the present invention relates to the construction of each of the side edges of the fish lure body which aid and facilitate the random swimming motion achieved by the lure. Each side edge is provided with a rise and corresponding dip along the length thereof, the opposed rises and dips on each of the side edges being asymmetrical. In addition, the trailing end of the fish lure body is provided with an upturned flange which extends upwardly transverse to the path of the water as it travels through the apertures and being directed thereagainst by the flared scoop portions associated with each of the apertures. The combination of the rises and dips in each of the side edges as well as the upturned flange at the trailing end of the fish lure body function to achieve a side-to-side motion as well as an up-and-down motion as the fish lure travels through the water. In this manner, the flared scoop portions each attempt to act as rudders to steer the fishing lure with each of the flared scoop portions pulling against the next adjoining flared scoop portions such that a random swimming motion is achieved.

The manner in which the subject fishing lure is constructed and its mode of operation is more distinctly described hereinbelow.

DETAILED DESCRIPTION OF INVENTION

With reference to the accompanying drawings, the details of the improved fishing lure of the present invention are disclosed. The fish lure generally denoted by the numeral 10, is shown to be formed by a fish lure body 12 bounded by side edges 13 and 14 respectively. The fish lure body 12 also includes a forward end 16 and a trailing end 18.

It will further be noted that the fish lure body 12 generally assumes an overall arcuate configuration extending from side edge 13 to side edge 14, as generally denoted by the numeral 20 (FIG. 1). The provision of the arcuate configuration results in the fish lure body 12 having a lower convex surface 22 and an upper concave surface 24 (FIGS. 3 and 5).

It will also be observed that fish lure body 12 is provided with a plurality of apertures 26 which are disposed through the fish lure body 12 in a plurality of rows spaced apart along the length thereof. Each of the apertures 26 is shown to be provided with a flared scoop portion 28 which extends along the circumferential periphery of at least a portion of the corresponding aperture 26. Each flared scoop portion 28 is shown to extend outwardly from the lower convex surface 22 of the fish lure body 12 as more clearly shown in FIGS. 1 and 6 of the drawings. It will further be noted, especially with reference to FIG. 2 of the drawings, that each of the flared scoop portions 28 is positioned in askew relationship relative to the next adjoining flared scoop portions 28 of adjoining apertures 26. The functional purpose of this structural relationship will be more fully described hereinafter. It will further be noted by reference to FIGS. 2 and 4 of the drawings, that each of the flared scoop portions 28 forms a trench 29 in the upper concave surface 24 of the fish lure body 12. Each of the trenches 29 functions to direct water which passes through the corresponding aperture 26 rearwardly toward the trailing end 18 of the fish lure body 12. The water, as it passes through the aperture 26 and along the trench 29, will ultimately strike the upturned flange 34 in a manner to be described hereinafter, and has a bearing upon the direction of the fish lure 10 as it travels through the water to achieve the proper swimming motion.

It will also be observed that the fish lure body 12 is provided with a fish line aperture 31 which permits the attachment of the subject fish lure 10 to the fishing line 30 in a manner commonly known in the art. It will also be observed that the trailing end 18 of the fish lure body 12 is provided with an upturned flange 34 which is positioned at an approximate ninety degree angle relative to the fish lure body 12. The upturned flange 34 functions to aid the swimming movement of the fish lure body 12 as it travels through the water, and in addition, serves as an attachment surface for the hook assembly generally denoted by the numeral 36.

It will further be observed from a view of FIGS. 3 and 5 of the drawings that each of the side edges 13 and 14, respectively, are provided with corresponding rises and dips. For example, with reference to FIG. 3 of the drawings, side edge 14 is shown to include a recess 15 adjacent to the forward end 16 thereof, and a rise 17 rearward of the recess 15, such that the side edge of 14 is not completely linear. Indeed, it will be appreciated that by providing a recess 15 and a rise 17 along the length of the side edge 14, a curvilinear effect is achieved. Similarly, with respect to side edge 13, as shown in FIG. 5, there is provided a recess 19 adjacent to the forward end 16 of the side edge 13, and a rise 21 rearward of the recess 19 which, again, creates a curvilinear effect with respect to side edge 13. It will also be appreciated that the corresponding recesses 15 and 19, respectively, and rises 17 and 21, respectively, are not in horizontally symmetrical relationship with respect to each other. In this manner, the side edges 13 and 14 respectively are both curvilinear, but the curvilinear configurations thereof are not in parallel or symmetrical orientation. This construction further facilitates the side-to-side or wobbling motion of the fish lure 10 as it travels through the water.

As indicated previously, each of the flared scoop portions 28 is positioned in askew relationship relative to the next adjacent and adjoining flared scoop portions 28 and in this manner, creates a movement which emulates a swimming movement of a body as it travels through the water. It will be appreciated from a view of the figures herein, that as the fish lure 10 is pulled through the water, such as incident to any trolling procedure, the flared scoop portions 28 act in a manner to catch the water and steer the water through the corresponding trenches 29, and in effect act as a rudder or steering devise for steering the fish lure 10. However, since each of the flared scoop portions 28 is positioned askew relative to the next adjoining flared scoop portion 28, a random swimming motion is thereby achieved. This motion is further obtained due to the arcuate configuration 20 of the fish lure body 12 in a manner heretofore described. In addition, the provision of the upturned flange 34 which extends at an approximate ninety degree angle relative to the fish lure body 12, and further positioned at the trailing end 18 of the body 12 further functions to facilitate this movement of the fish lure 10 through the water.

The upturned flange 34 is positioned relative to the upper concave surface 24 such that as water passes through the apertures 26, and is directed by the trenches 29, the water will strike against the upturned flange 34 and facilitate the up and down movement of the lure 10 as it travels through the water. In this connection, as was previously indicated, the flared scoop portions 28 are constructed such that the same are positioned and extend downwardly relative to the lower convex surface 22, and hence function to catch the water and direct it via the trenches 29 to strike the upturned flange 34 to facilitate to the above-noted movement.

It has been found that by having the flared scoop portions associated with each of the apertures, and further being positioned askew one relative to the next, an interesting random swimming movement is achieved which functions to give greater assurance that the lure 10 will be more attractive to any fish in the vicinity. Indeed, experimentation has shown that a higher degree of success is achieved with a fish lure of the present invention than with similar apertured fish lures heretofore available.

The above movement is further facilitated by the fact that the forward end 16 of the fish lure body 12 is shown to have a side to side dimension which is less than the side to side dimension of the trailing end 18 of the fish lure body 12. Hence, it will be appreciated that as the lure 10 is pulled through the water by the fishing line 30, the smaller portion of the fish lure body 12 forms the forward end of the lure 10. It has also been found that dimensionally, it is preferred that each flared scoop portion 28 extends for a distance along the circumferential periphery of the corresponding aperture 26 for a distance slightly less than one-half of the overall circumference of the corresponding aperture 26. This relationship is depicted in FIG. 7 of the drawings. In this manner, a sufficient flared scoop 28 is provided to achieve the desired motion, without exaggerating the configuration of the lure 10, or rendering the flared scoop portion 28 so large that the desired movement is adversely affected.

As indicated previously, based upon experimental tests utilizing the fishing lure of the present invention, it has been found that a greater degree of success is achieved in terms of attracting fish due to the motion of the lure as it travels through the water. It is also possible that in addition to the motion of the lure through the water, the provision of apertures having flared portions surrounding a portion of the aperture also achieves sonic vibrations which further functions to attract fish which may be in the vicinity and thereby adds to the success of the utilization of the lure of the present invention.

Where it has been described what is at present considered to be the preferred embodiments of the invention, it will be understood that various modifications may be made therein and without departing from the basic spirit and scope of the present invention. It is intended that all such obvious modifications and variations are intended to be covered.

What is claimed is:

1. A fish lure capable of emulating a random swimming motion comprising
    an elongate lure body having a forward end and a trailing end and opposed side edges, and having a substantially overall side to side arcuate configuration and including a convex bottom surface and a concave top surface,
    each of said opposed side edges includes a recess disposed adjacent to said forward end of said lure, and a rise portion positioned rearward of said recess portion, the corresponding recess and rise portions of each of said side edges being asymmetrical along a horizontal axis measured from one side edge to the opposed side edge thereof,
    said lure body provided with a plurality of apertures disposed through said lure body in a plurality of rows spaced apart along the length thereof,
    each of said apertures being provided with a flared scoop disposed along a portion of the circumferential periphery of said corresponding aperture and extending outwardly from said convex bottom surface,
    each of said flared scoops facing in the general direction of said forward end of said lure body and being positioned askew with respect to the adjacent flared scoops of the immediately adjacent rows such that none of the flared scoops in the immediately adjacent rows are in parallel alignment one with respect to the other, and said fish lure being completed by tie means at said forward end thereof to permit attachment to a fish line, and a hook assembly secured to said trailing end thereof, said trailing end further being provided with a flange positioned at approximately a ninety degree angle relative to said lure body and transverse to the path of water as it travels through said apertures and directed thereagainst by said flared scoops associated with each of the apertures, whereby when said fish lure is in use, said flared scoops associated with each of said apertures will function to have the tendency to direct said fish lure body in different random directions, while said arcuate configuration of said lure body will cause said fish lure to travel in an up and down and side to side pathway such that said fish lure body will have the overall appearances emulating a random swimming motion thereby to function as a source of attraction to fish.

2. The fish lure as set forth in claim 1 above, wherein each of said flared scoops extends for a distance less than one-half of the circumferential periphery of said corresponding aperture.

3. The fish lure as set forth in claim 1 above wherein said side to side dimension of said forward end of said fish lure is lesser than the side to side dimension of said trailing end of said fish lure.

* * * * *